United States Patent

Ishizuka et al.

[11] Patent Number: 5,997,180
[45] Date of Patent: Dec. 7, 1999

[54] CIRCUMFERENTIAL FLOW TYPE DYNAMIC PRESSURE BEARING

[75] Inventors: Kachu Ishizuka; Akiyoshi Takahashi; Nakazo Ariyama; Hiroki Matsushita; Takeshi Hijiya, all of Iruma, Japan

[73] Assignee: Copal Electronics Co., Ltd., Tokyo, Japan

[21] Appl. No.: 09/080,455

[22] Filed: May 19, 1998

[30] Foreign Application Priority Data

Dec. 25, 1997 [JP] Japan .................................. 9-370300

[51] Int. Cl.⁶ ....................................................... F16C 32/06
[52] U.S. Cl. ........................... 384/115; 384/100; 384/118
[58] Field of Search .................................. 384/100, 114, 384/115, 118, 120

[56] References Cited

U.S. PATENT DOCUMENTS 3,484,143 12/1969 Tallian et al. ........................... 384/114
5,593,230 1/1997 Tempest et al. ...................... 384/118 X
5,746,515 5/1998 Takahashi et al. ...................... 384/115

FOREIGN PATENT DOCUMENTS 5-215128 8/1993 Japan ..................................... 384/115

Primary Examiner—Thomas R. Hannon
Attorney, Agent, or Firm—Wenderoth, Lind & Ponack, L.L.P.

[57] ABSTRACT

A circumferential flow type dynamic pressure bearing 1 is comprised of a shaft 2 having a multiple-arc-shaped pressure generating surface and a circular sleeve 3 fitted on the shaft 2. The shaft or the sleeve is formed with a plurality of proximity portions 4 each of which is close in distance to the surface opposed thereto whereby the support force of gas is generated. A plurality of grooves 5 formed at locations spaced from each other by an angle obtained by dividing the circumference by the number of proximity portions 4 or a divisor thereof. Use of such bearing ensures compatibility with high-humidity environmental conditions by provision of grooves, and at the same time it is capable of eliminating or reducing noise generated by vibration caused by radial deviations of the shaft due to provision of the grooves.

3 Claims, 4 Drawing Sheets

CIRCUMFERENTIAL FLOW TYPE DYNAMIC PRESSURE BEARING

BACKGROUND OF THE INVENTION

1. Field of the Invention

This invention relates to a circumferential flow type dynamic pressure bearing having opposed surfaces formed with proximity portions that generate a support force by gas pressure to thereby carry out a high-speed rotation supporting operation. More particularly, the invention relates to a circumferential flow type dynamic pressure bearing of this kind which has grooves formed therein to secure compatibility with high-humidity environmental conditions, and is at the same time capable of reducing noise generated by vibration caused by the run-out of the grooves.

2. Description of the Related Art

The present applicant proposed a dynamic pressure bearing compatible with high-humidity environmental conditions in Japanese Unexamined Patent Publication (Kokai) No. Hei 9-210052. The bearing disclosed therein includes a circumferential flow type dynamic pressure bearing for use in a rotary mirror scanner using a rotary mirror operating at a high rotational speed. This bearing is made compatible with high-humidity environmental conditions while preserving the run-out precision.

As shown in FIG. 10, this dynamic pressure bearing 101 is comprised of a dynamic pressure shaft 102 and a dynamic pressure sleeve 103 fitted thereon. The dynamic pressure shaft 102 has opposed surfaces formed with proximity portions 104, and the dynamic pressure sleeve 103 has a groove 105 serving as a water drain passage.

The proximity portions 104 are portions formed to provide reduced clearance between the opposed surfaces of the shaft 102 and the sleeve 103, whereby the support force of gas pressure is generated by the relative rotation of the shaft 102 and the sleeve 103 with respect to each other without producing a flow of the gas in the axial direction. This prevents foreign matter from being drawn in and thereby enables the bearing to maintain the precision over a long period of time. Further, the groove 105 prevents moisture vapor from being liquefied by the change in gas pressure so that it is possible to prevent a water layer from forming without requiring the flow of gas in the axial direction. Thereby, abnormal loads are prevented from being applied to the bearing due to the water layer under high-humidity environmental conditions.

The dynamic pressure shaft 102 of the dynamic pressure bearing 101, however, undergoes run-out or radial deviation of the axis thereof due to an imbalance which occurs whenever each proximity portion 104 passes by the groove 105 during rotation of the shaft 102. If the shaft 102 has a triple-arc-shaped pressure-generating surface, it undergoes three radial deviations per rotation of the shaft. Hence, it generates vibrations having a frequency three times as high as the rotational speed of the shaft 102. Due to this vibration, problems are caused in that temporary audible sounds are produced in the course of change in the rotational speed before the operating rotational speed of the bearing is reached. This problem of noise generated by vibration caused by radial deviations of the shaft has not been solved even by forming the groove into a helical shape.

SUMMARY OF THE INVENTION

The object of the invention is to provide a circumferential flow type dynamic pressure bearing which ensures compatibility with high-humidity environmental conditions through the provision of grooves, and at the same time is capable of reducing noise generated by vibration caused by run-out or radial deviations of the shaft due to the provision of the grooves.

To solve the above problems, a circumferential flow type dynamic pressure bearing is provided which includes a dynamic pressure shaft and a dynamic pressure sleeve fitted on the shaft. The shaft or the sleeve is formed with proximity portions which are close in distance to a surface opposed thereto whereby a supporting gas force is generated. A plurality of grooves are formed along respective crests of the proximity portions, the grooves being spaced from each other in a circumferential direction at a distance obtained by equally dividing the circumferential distance by the number of proximity portions or a divisor of the number.

According to this dynamic pressure bearing, the grooves are formed along the respective crests of the proximity portions, and the grooves are spaced from each other by a fixed angle dependent on the number of proximity portions. Therefore, the radial balance of the shaft is secured through the combined effects caused by the action of all the grooves. Hence, the shaft and the sleeve are capable of rotating relative to each other without undergoing a variation in positional relationship between the proximity portion side and the opposite side thereto. This enables the bearing to maintain a constant rotational axis.

In an alternate embodiment, in a circumferential flow type dynamic pressure bearing including a dynamic pressure shaft and a dynamic pressure sleeve fitted on the shaft, the shaft or the sleeve is formed with proximity portions which are close in distance to a surface opposed thereto so that a supporting gas force is generated. A plurality of grooves are formed on a side opposed to the proximity portions, the grooves being spaced from each other in a circumferential direction by a distance obtained by dividing the circumferential distance by the number of proximity portions or a divisor of the number.

According to this dynamic pressure bearing, grooves are formed in the curved surface opposed to the proximity portions at locations spaced from each other by an angle dependent on the number of proximity portions. Therefore, the radial balance of the shaft is ensured through the combined effects caused by the actions of all the grooves. Hence, the shaft and the sleeve are capable of rotating relative to each other without a variation in positional relationship between the proximity portion side and the opposite side thereto. As with the first embodiment, this enables the bearing to always maintain a constant rotational axis.

When the grooves are each formed so as to have a helical shape, they produce small axial streams of gas. Therefore, even if the grooves are formed in a limited range corresponding to part of the whole length of the bearing, the grooves operate to exchange the gas over the whole length of the bearing, whereby the drainage of water can be obtained over the whole length of the bearing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
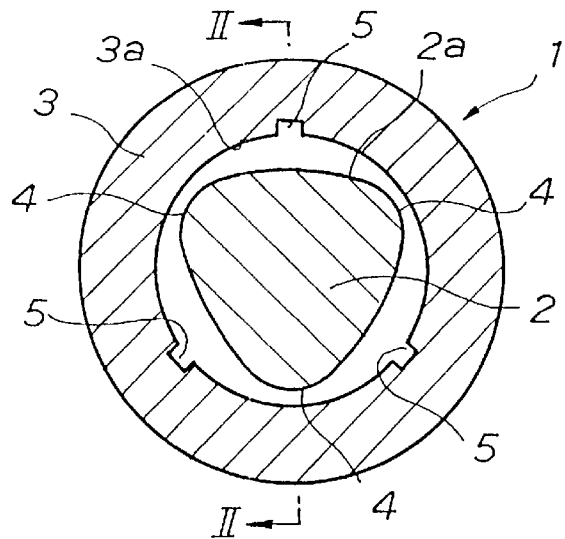
FIG. 1 is a cross-sectional view of a dynamic pressure bearing according to a first embodiment of the invention.

FIG. 1 is a cross-sectional view of a dynamic pressure bearing according to a first embodiment of the invention.

A dynamic pressure bearing 1 is comprised of a shaft 2 having a multiple-arc-shaped pressure-generating surface and a circular sleeve 3 fitted on the multiple-arc-shaped shaft 2. The shaft 2 has an outer peripheral surface 2a formed as a triple-arc-shaped pressure-generating surface having a cross-section the periphery of which is formed by three eccentric arcs. The circular sleeve 3 opposed to the multiple-arc-shaped shaft 2 has an inner peripheral surface 3a formed by a circular curved surface in a circular cross-sectional shape. The peripheral surface 2a of the multiple-arc-shaped shaft 2 has three crests which form proximity portions 4 which are close in distance to the opposed surface. The inner surface 3a of the sleeve 3 is formed with a plurality of axial grooves 5 at locations corresponding to divisions obtained by equally dividing the circumference by the number of the proximity portions 4. Each groove 5 is identical in cross-section and serves as a water drain passage.

Figure 2:
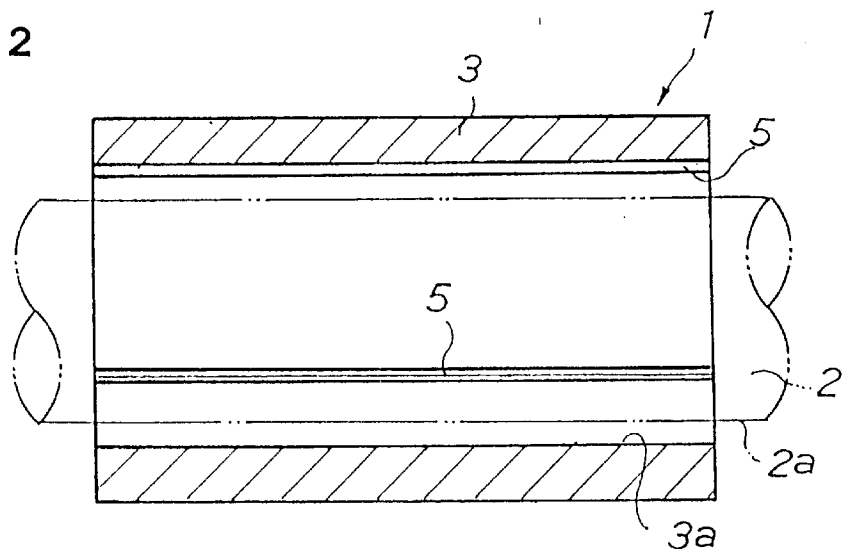
FIG. 2 is a cross-sectional view taken along the line II—II of FIG. 1.

FIG. 2 is a cross-sectional view taken along the line II—II of FIG. 1.

The grooves 5 are each formed along the whole length of the bearing or in a range corresponding to part of the axial length at locations identical in phase difference. The overall length of the bearing corresponds to the length of the sleeve 3, the length of the proximity portions 4 of the multiple-arc-shaped shaft 2, etc., where the support force of the dynamic pressure is generated. When the grooves 5 are formed in a limited range corresponding to the overall length, this range is required to be determined according to the degree of required compatibility of the bearing with the humidity of the environment. Within this determined range, these grooves are formed at locations identical in phase difference, i.e. grooves having the same length are formed in the same range of the axial length of the sleeve.

In the dynamic pressure bearing 1, the grooves 5 are formed in the curved surface 3a opposed to the proximity portions 4 in a manner spaced by a fixed angle dependent on the number of the proximity portions 4. This causes effects generated by the interaction of the grooves 5 with the opposed surface of the shaft 2 to cancel each other and ensure the radial balance of the shaft 2. Hence, the shaft 2 and the sleeve 3 is able to rotate relative to each other without undergoing variation in the positional relationship therebetween. As a result, the bearing always maintains a constant rotational axis. Therefore, the dynamic pressure bearing is not only made compatible with high-humidity environmental conditions through provision of the grooves, but also is capable of reducing noise generated by vibration caused by radial deviations of the shaft 2 due to the provision of the grooves 5.

Figure 3:
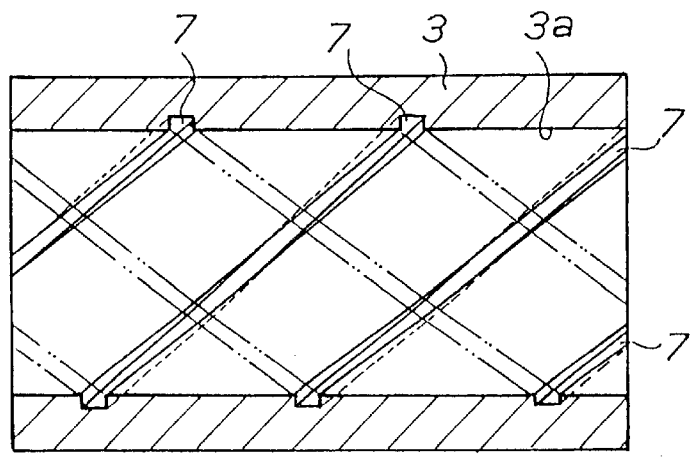
FIG. 3 is a cross-sectional view of a variation of a sleeve appearing in the FIG. 1 dynamic pressure bearing shown in FIG. 1.

FIG. 3 is a vertical cross-sectional view of a variation of the sleeve of the dynamic pressure bearing shown in FIG. 1.

Grooves 7 of this embodiment are each formed into a helical shape at respective locations in the inner peripheral surface 3a of the sleeve 3 with such positional relationship that they are spaced from each other by a fixed angle dependent on the number of proximity portions 4. That is, the grooves 7 are identical to each other both in cross-sectional and helical shape, and formed along the whole length of the bearing or in a range corresponding to part thereof at respective locations having an identical length and an identical phase difference.

Since the grooves 7 each have a helical shape, they provide small axial streams of the gas, so that even if the grooves are limited to a range corresponding to part of the whole length of the bearing, the grooves operate to exchange the gas over the whole length of the bearing, whereby the action of drainage of water can be obtained. Alternatively, by forming the proximity portions 4 into helical shapes, the same effects can be obtained even if the grooves are each formed into a linear shape.

Figure 4:
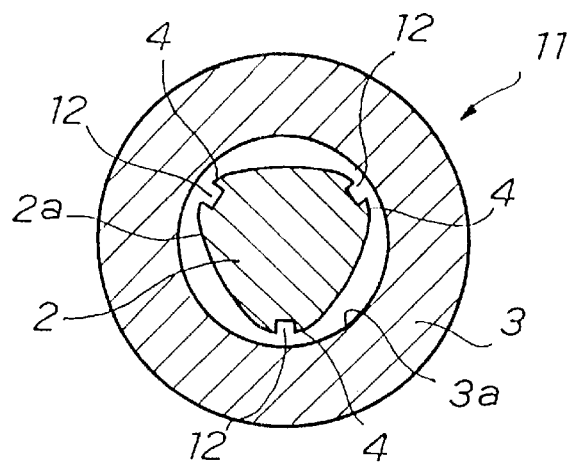
FIG. 4 is a cross-sectional view of a dynamic pressure bearing according to a second embodiment of the invention.

FIG. 4 is a cross-sectional view of a dynamic pressure bearing according to a second embodiment of the invention. In the following, members and component parts similar to those described above will be referred to by identical reference numerals, and detailed description thereof will be omitted.

A dynamic pressure bearing 11 has grooves 12 similar to those described above formed at locations of the proximity portions 4 of the peripheral surface 2a corresponding to the multiple-arc-shaped shaft 2. The grooves 12 are formed along the respective crests of the proximity portions over a required axial length.

The grooves 12 of the dynamic pressure bearing 11 are formed at locations spaced from each other by a fixed angle dependent on the number of the proximity portions 12. This causes the effects generated by the interaction of the grooves 11 with the opposed surface of the shaft 2 to cancel each other, thereby ensuring the radial balance of the shaft 2. Hence, the shaft 2 and the sleeve 3 are able to rotate relative to each other without undergoing variation in the positional relationship of the proximity portions and the opposed portions. As a result, similarly to the first embodiment, the dynamic pressure bearing 11 not only ensures the actions of the grooves but also is capable of reducing noise generated by vibration caused by radial deviations of the shaft 2 due to provision of the grooves 12.

Figure 5:
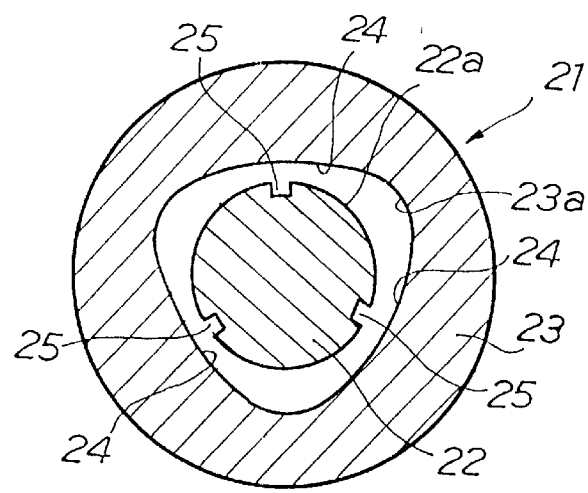
FIG. 5 is a cross-sectional view of a dynamic pressure bearing according to a third embodiment of the invention.

FIG. 5 is a cross-sectional view of a dynamic pressure bearing according to a third embodiment of the invention. In the following, a description will be made of a dynamic pressure bearing using a sleeve having a multiple-arc-shaped pressure-generating surface.

A dynamic pressure bearing 21 is comprised of a shaft 22 having a circular cross-section, and a sleeve 23 having a multiple-arc-shaped pressure-generating surface, which is fitted on the shaft 22. The sleeve 23 has an inner peripheral surface 23a formed as a triple-arc-shaped pressure-generating surface having a cross-section the periphery of which is formed by three eccentric arcs. The shaft 22 opposed to the sleeve 23 has a peripheral surface 22a which is circular in cross-section. The smallest diameter portions of the sleeve 23 form proximity portions 24 which are close in distance to the opposed surface. The peripheral surface 22a of the shaft 22 is formed with a plurality of axial or helical grooves 25. The grooves 25 are identical to each other in cross-section at locations corresponding to divisions of the circumference obtained by equally dividing the circumference by the number of the proximity portions 24 over a required axial length.

Figure 6:
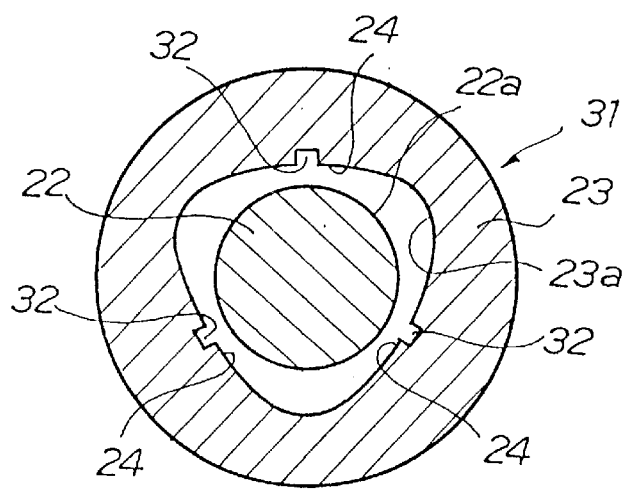
FIG. 6 is a cross-sectional view of a dynamic pressure bearing according to a fourth embodiment of the invention.

FIG. 6 is a cross-sectional view of a dynamic pressure bearing according to a fourth embodiment of the invention. This embodiment as well exemplifies the case in which the invention is applied to the dynamic pressure bearing using a sleeve having a multiple-arc-shaped pressure-generating surface.

In a dynamic pressure bearing 31, grooves 32 similar to those described above are formed at locations of the proximity portions 24 of the inner peripheral surface 23a of the sleeve 23 along the proximity portions 24 over a required axial length.

The grooves 25, 32 of the dynamic pressure bearings 21, 31 are formed, in both of these embodiments, at locations spaced from each other by a fixed angle obtained by equally dividing the respective circumferences by the number of the proximity portions. These grooves act as a whole to make the shaft 22 radially balanced, and the shaft 22 and the sleeve 23 are capable of rotating relative to each other without undergoing variation in the positional relationship between the proximity portions and the opposed surface. Therefore, it is possible to obtain the same effects as provided by the dynamic pressure bearing which uses the shaft having the multiple-arc-shaped pressure-generating surface.

Figure 7:
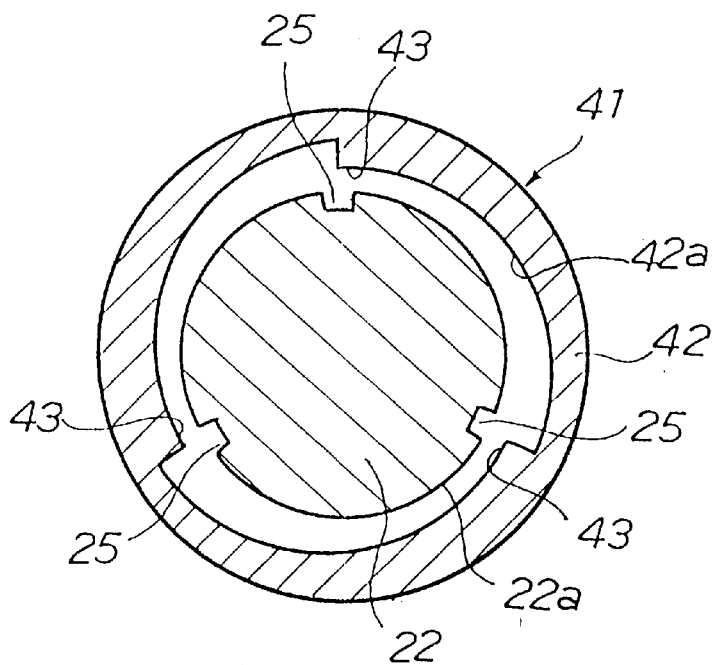
FIG. 7 is a cross-sectional view of a dynamic pressure bearing according to a fifth embodiment of the invention.

FIG. 7 is a cross-sectional view of a dynamic pressure bearing according to a fifth embodiment of the invention. In the following, description will be made of the case in which the invention is applied to a so-called wedge-type dynamic pressure bearing.

A dynamic pressure bearing 41 is comprised of a shaft 22 having a circular cross-section, and a wedge-shaped pressure-generating surface-type sleeve 42 fitted on the shaft 22. The sleeve 42 has an inner peripheral surface 42a having three wedge-shaped cutout portions each having a wedge-shaped cross-section varying in radial dimensions, and the shaft 22 opposed to the sleeve 42 has a peripheral surface 22a which is circular in cross-section. The smallest diameter portions of the sleeve 42 form the proximity portions 43 which are close in distance to the opposed surface. The peripheral surface 22a of the shaft 22 is formed with a plurality of axial or helical grooves 25. These grooves 25 are identical to each other in cross-section at locations corresponding to divisions of the circumference obtained by equally dividing the circumference by the number of proximity portions 43 over a required axial length.

Figure 8:
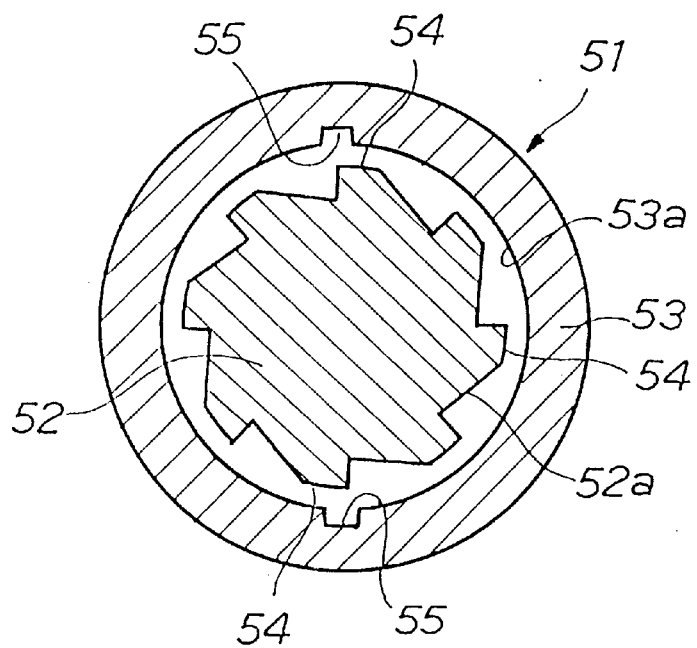
FIG. 8 is a cross-sectional view of a dynamic pressure bearing according to a sixth embodiment of the invention.

FIG. 8 is a cross-sectional view of a dynamic pressure bearing according to a sixth embodiment of the invention. This embodiment also exemplifies the case in which the invention is applied to a wedge-type dynamic pressure bearing.

A dynamic pressure bearing 51 is comprised of a shaft 52 formed with a number of wedge-shaped recesses and a circular sleeve 53 fitted on the shaft 52. The sleeve 53 has an inner peripheral surface 53a formed with grooves 55, similar to those described above, which extend over a required axial length at respective locations opposed to the proximity portions 54. The grooves 55 are spaced from each other by a fixed angle obtained by equally dividing the circumference by the number of proximity portions 54 of the shaft 52 or a devisor thereof. For example, assuming that the number of proximity portions is 8, the devisor is 4 or 2, and similarly, assuming that the number of proximity portions is 6, the divisor is 3 or 2.

The grooves 25, 55 of these dynamic pressure bearings 41, 51 are, in both of the embodiments, formed at locations spaced from each other by a fixed angle obtained by equally dividing the circumference by the number of proximity portions 54 or the devisor of the same. The effects generated by the interaction of the grooves 25, 55 with the opposed surface of the shaft 41, 51 cancel each other to ensure the radial balance of the shaft 52. Hence, the shaft 52 and the sleeve 53 are able to rotate relative to each other without undergoing variation in the positional relationship between the proximity portions and the opposed surfaces. As a result, the wedge-type dynamic pressure bearings 41, 51 provide the same advantageous effects as obtained by the dynamic pressure bearings using the respective shaft and sleeve having multiple-arc-shaped pressure-generating surfaces.

Thus, the grooves are formed at such locations spaced from each other by a fixed angle obtained by equally dividing the circumference by a number dependent on the number of proximity portions or by a devisor equal to or larger than "2" by which the number of proximity portions can be divided. This makes it possible to secure the radial balance of the shaft in spite of the provision of grooves, whereby the concentricity of the shaft and the sleeve can be maintained.

Figure 9:
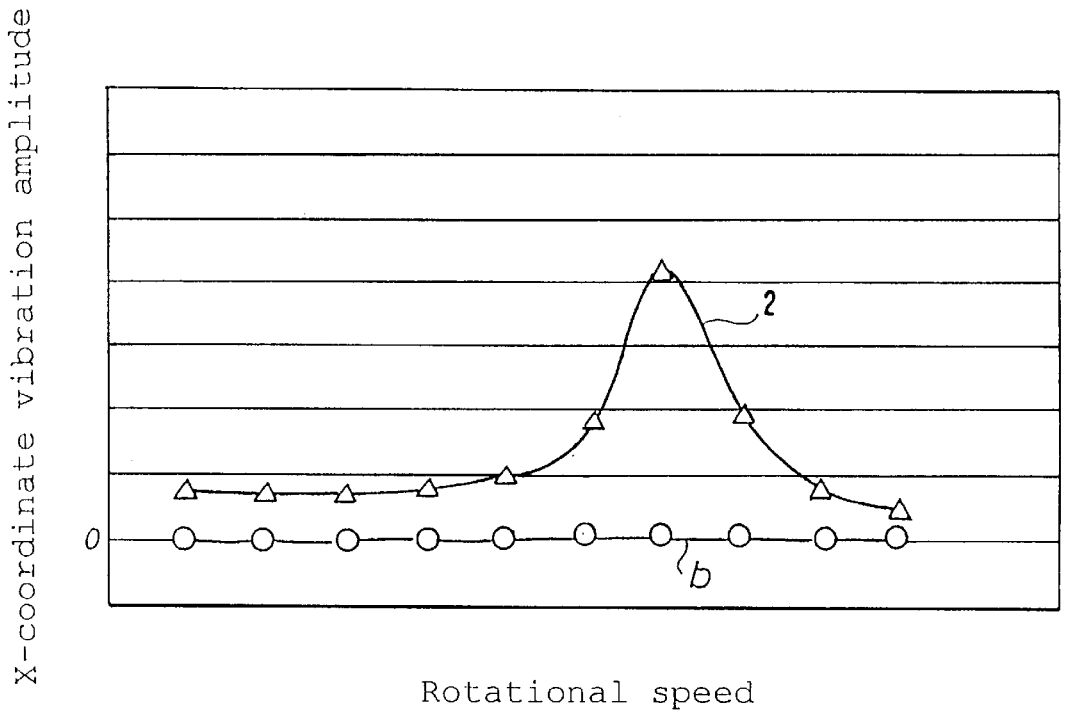
FIG. 9 is a radial vibration amplitude characteristic chart showing results of analysis of operation of the dynamic pressure bearing of the present invention.
Figure 10:
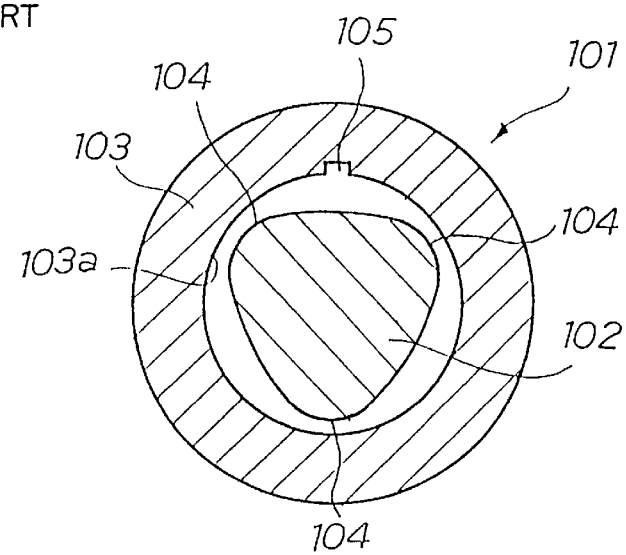
FIG. 10 is a cross-sectional view of a conventional circumferential flow type dynamic pressure bearing according to the prior art.

FIG. 9 is a chart plotting a radial vibration amplitude characteristic curve which shows results of analysis of the operation of the dynamic pressure bearing of the present invention.

According to the fast Fourier transformation of the X-coordinate vibration amplitude of the tripled frequency of each rotational speed, as is clear from a characteristic curve b, the dynamic pressure bearing of the present invention provides excellent results in that no X-coordinate vibration amplitude is detected over the whole range of rotational speeds. In contrast, to the characteristic curve a of the prior art dynamic pressure bearing shows a constant vibration amplitude over the whole range of the rotational speed and a peak at a particular rotational speed.

As described above, the effects of the dynamic pressure bearing of the present invention is due to the fact that the radial balance of the shaft is obtained by the combined effects caused by all of the plurality of grooves formed at locations spaced from each other by a fixed angle obtained by equally dividing the circumference by the number of proximity portions or a divisor of the same. Therefore, the grooves are not required to have a continuous shape in the longitudinal direction. Further, it is apparent that the same effects can be obtained by oblong or circular grooves arranged at locations identical in phase difference, and hence the description thereof is omitted.

The circumferential flow type dynamic pressure bearing of the present invention provides the following advantageous effects:

By forming predetermined grooves along respective crests of proximity portions in a manner dependent on the number of the proximity portions or devisor of the same, the radial balance of the shaft is ensured through the combined effects caused by all the grooves. Hence, the shaft and the sleeve are capable of rotating relative to each other without undergoing variation in positional relationship between the proximity portion side and the opposite surface thereto. This enables the bearing to maintain a constant rotational axis.

Therefore, the dynamic pressure bearing of the invention is advantageous over a conventional circumferential flow type dynamic pressure bearing which is capable of controlling inclusion of dust and foreign matter in the bearing because it is made compatible with high-humidity environmental conditions as well as reducing noise generated by vibration caused by radial deviations of the shaft due to the provision of the grooves.

By forming predetermined grooves in a manner dependent on the number of proximity portions of a dynamic pressure bearing on a side opposed to the proximity portions, the radial balance of a shaft is ensured through the combined effects caused by all the grooves. Hence, the shaft and a sleeve are capable of rotating relative to each other without undergoing variation in positional relationship between the proximity portion side and the opposite side thereto. This enables the bearing to maintain a constant rotational axis.

As a result, the dynamic pressure bearing of the invention is advantageous over a conventional circumferential flow type dynamic pressure bearing in that it is capable of securing compatibility with high-humidity environmental conditions as well as reducing noise produced by vibration caused by radial deviation of the shaft due to provision of the grooves.

When the grooves are each formed to have a helical shape, they produce small axial streams of gas, so that even if the grooves are formed in a limited range corresponding to part of the whole length of the bearing, it is possible to obtain the action of drainage of water over the whole length of the bearing.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

We claim:

1. A circumferential flow dynamic pressure bearing comprising:

a dynamic pressure shaft having an outer peripheral surface;

a dynamic pressure sleeve having an inner peripheral surface, said sleeve being fitted around said shaft;

wherein one of said outer peripheral surface of said shaft and said inner peripheral surface of said sleeve includes a plural number of proximity portions and is defined as a groove peripheral surface, each of said proximity portions having a crest, each of said proximity portions being formed such that said outer peripheral surface of said shaft and said inner peripheral surface of said sleeve are close to each other at each of said proximity portions whereby a supporting gas force is generated; and wherein a plurality of grooves are formed along said crests of said plural number of proximity portions, said plurality of grooves being evenly spaced apart in a circumferential direction of said groove peripheral surface at an arc length determined by dividing a circumferential distance of said groove peripheral surface by said number of said proximity portions or a divisor of said number.

2. A circumferential flow dynamic pressure bearing comprising:

a dynamic pressure shaft having an outer peripheral surface;

a dynamic pressure sleeve having an inner peripheral surface, said sleeve being fitted around said shaft;

wherein one of said outer peripheral surface of said shaft and said inner peripheral surface of said sleeve includes a plural number of proximity portions, an opposing peripheral surface being defined as one of said outer peripheral surface of said shaft and said inner peripheral surface of said sleeve that does not include said plural number of proximity portions, each of said proximity portions being formed such that said outer peripheral surface of said shaft and said inner peripheral surface of said sleeve are close to each other at each of said proximity portions whereby a supporting gas force is generated; and wherein a plurality of grooves are formed along said opposing peripheral surface, said plurality of grooves being evenly spaced apart in a circumferential direction of said opposing peripheral surface at an arc length determined by dividing a circumferential distance of said opposing peripheral surface by said number of said proximity portions or a divisor of said number.

3. The pressure bearing of claim 2, wherein each of said grooves has a helical shape.

* * * * *